(12) United States Patent
Benson et al.

(10) Patent No.: US 11,780,151 B2
(45) Date of Patent: *Oct. 10, 2023

(54) APPARATUS FOR PREFORMING AT LEAST A PORTION OF A MATERIAL

(71) Applicant: Northrop Grumman Systems Corporation, Falls Church, VA (US)

(72) Inventors: Vernon M. Benson, Morgan, UT (US); Peter G. Turner, Eden, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,472

(22) Filed: Jul. 2, 2020

(65) Prior Publication Data
US 2020/0331189 A1 Oct. 22, 2020

Related U.S. Application Data

(60) Continuation of application No. 15/050,241, filed on Feb. 22, 2016, now Pat. No. 10,730,227, which is a division of application No. 12/832,251, filed on Jul. 8, 2010, now Pat. No. 9,266,279.

(51) Int. Cl.
| | |
|---|---|
| *B29C 55/18* | (2006.01) |
| *B29C 70/54* | (2006.01) |
| *B29C 70/28* | (2006.01) |
| *B29C 55/06* | (2006.01) |
| *B29K 105/08* | (2006.01) |
| *B29C 70/32* | (2006.01) |

(52) U.S. Cl.
CPC .............. *B29C 55/18* (2013.01); *B29C 70/28* (2013.01); *B29C 70/54* (2013.01); *B29C 55/06* (2013.01); *B29C 70/32* (2013.01); *B29K 2105/08* (2013.01); *B29K 2105/0872* (2013.01)

(58) Field of Classification Search
CPC .......... B29C 55/06; B29C 55/18; B29C 70/32
See application file for complete search history.

(56) References Cited

U.S. PATENT DOCUMENTS

| | | | | |
|---|---|---|---|---|
| 2,501,584 | A | * | 3/1950 | Schanz ........................... 425/86 |
| 2,758,048 | A | | 8/1956 | Ceretti |
| 2,948,646 | A | | 8/1960 | Richardson |

(Continued)

FOREIGN PATENT DOCUMENTS

| | | |
|---|---|---|
| DE | 102008028441 A1 | 12/2009 |
| EP | 1504880 A1 | 2/2005 |

(Continued)

OTHER PUBLICATIONS

Communication pursuant to Art. 94 (3) EPC for European Patent Application 11162093.6, dated Feb. 17, 2016, 4 pages.

(Continued)

*Primary Examiner* — Jerzi H Moreno Hernandez
(74) *Attorney, Agent, or Firm* — TraskBritt

(57) ABSTRACT

Apparatus and methods of stretch-forming material are provided. In one example embodiment, a variable material stretch-forming apparatus comprises a stretch-forming assembly configured to stretch-form at least one section of a sheet of material to a longer length than at least one other section of the sheet of material before the sheet of material is applied to a tool.

20 Claims, 16 Drawing Sheets

(56) References Cited

U.S. PATENT DOCUMENTS

| | | | |
|---|---|---|---|
| 3,171,517 A | | 3/1965 | Howell |
| 3,498,862 A | * | 3/1970 | Mauro ............... B29C 53/04 28/103 |
| 3,624,874 A | * | 12/1971 | Lauchenauer ......... B29C 55/18 28/165 |
| 3,708,831 A | | 1/1973 | Burger |
| 3,757,554 A | | 9/1973 | Kida et al. |
| 3,799,715 A | * | 3/1974 | Miura ............... B29C 55/06 425/325 |
| 4,151,031 A | * | 4/1979 | Goad ............. B29C 66/91645 156/201 |
| 4,154,077 A | | 5/1979 | Cotter |
| 4,223,063 A | | 9/1980 | Sabee |
| 4,808,357 A | * | 2/1989 | Bourcier ............. B29C 55/045 264/281 |
| 5,071,601 A | | 12/1991 | Matsuda |
| 5,195,296 A | | 3/1993 | Matsumoto |
| 5,307,609 A | * | 5/1994 | Kurata ............... B29C 55/20 53/556 |
| 5,797,246 A | * | 8/1998 | Martin-Cocher ...... B29C 55/06 53/399 |
| 6,076,718 A | | 6/2000 | Matsuda et al. |
| 6,454,555 B1 | | 9/2002 | Kierbel et al. |
| 7,186,361 B2 | | 3/2007 | Kasai et al. |
| 7,419,372 B2 | | 9/2008 | Kasai et al. |
| 10,730,227 B2 | * | 8/2020 | Benson ............... B29C 70/54 |
| 2002/0119720 A1 | | 8/2002 | Arora et al. |
| 2004/0044322 A1 | * | 3/2004 | Melius ............... B29C 55/18 26/99 |
| 2004/0102045 A1 | | 5/2004 | Chopra et al. |
| 2005/0269016 A1 | | 12/2005 | Oldani et al. |
| 2006/0083806 A1 | | 4/2006 | Kasai et al. |
| 2007/0029038 A1 | | 2/2007 | Brown et al. |
| 2007/0040301 A1 | | 2/2007 | Jackson |
| 2007/0125492 A1 | | 6/2007 | Venkitaraman et al. |
| 2007/0163323 A1 | | 7/2007 | Polen et al. |
| 2008/0228159 A1 | | 9/2008 | Anderson et al. |
| 2008/0299395 A1 | | 12/2008 | Strange et al. |
| 2009/0081443 A1 | | 3/2009 | Benson et al. |
| 2009/0130450 A1 | | 5/2009 | Anderson et al. |
| 2010/0040875 A1 | | 2/2010 | Patel et al. |
| 2010/0252179 A1 | | 10/2010 | Schoppmeier et al. |
| 2010/0279076 A1 | | 11/2010 | Kim |
| 2010/0285265 A1 | * | 11/2010 | Shinoda ............. B29B 11/16 428/80 |
| 2012/0007278 A1 | | 1/2012 | Benson et al. |
| 2013/0020736 A1 | | 1/2013 | Oku et al. |

FOREIGN PATENT DOCUMENTS

| | | |
|---|---|---|
| JP | 2005-059260 A | 3/2005 |
| WO | 2006/119002 A2 | 11/2006 |
| WO | 2007/018935 A1 | 2/2007 |
| WO | 2008/019894 A1 | 2/2008 |
| WO | 2009/004364 A2 | 1/2009 |
| WO | 2009/112694 A2 | 9/2009 |
| WO | 2009/115734 A2 | 9/2009 |
| WO | 2010/047980 A1 | 4/2010 |

OTHER PUBLICATIONS

Communication pursuant to Art. 94 (3) EPC for European Patent Application 11162093.6, dated Nov. 3, 2016, 3 pages.

European Search Report for European Patent Application 11162093.6 dated Oct. 20, 2011.

* cited by examiner

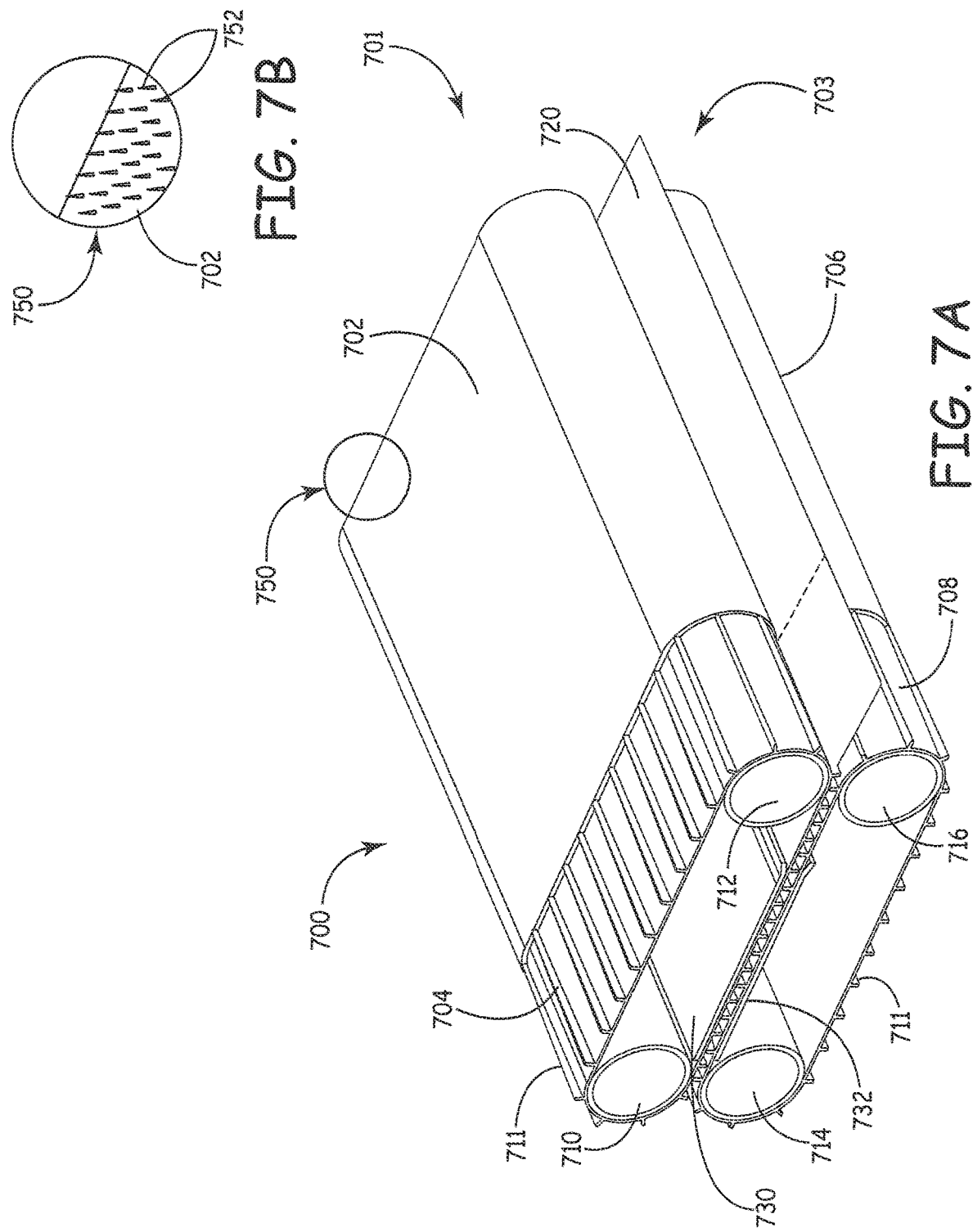

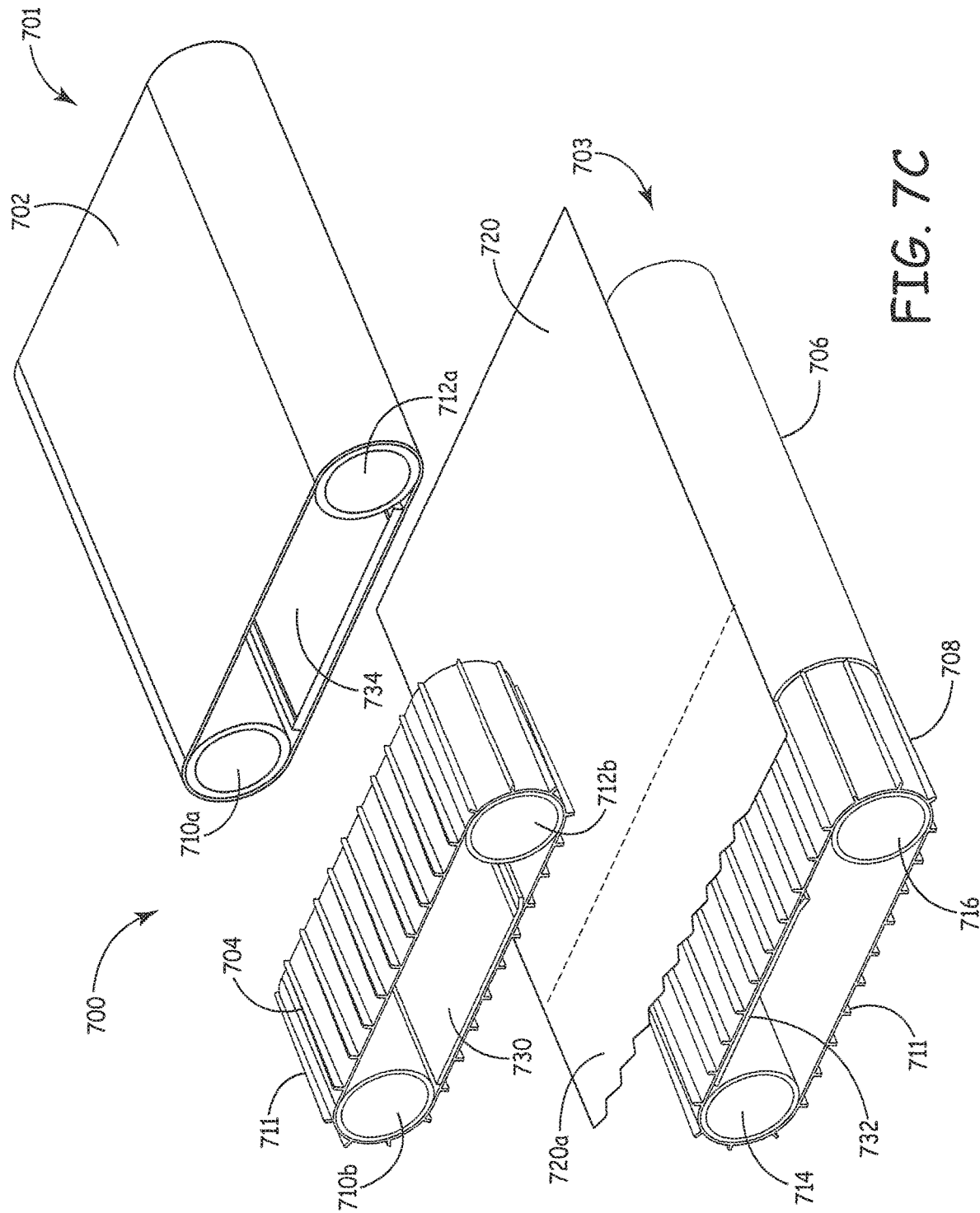

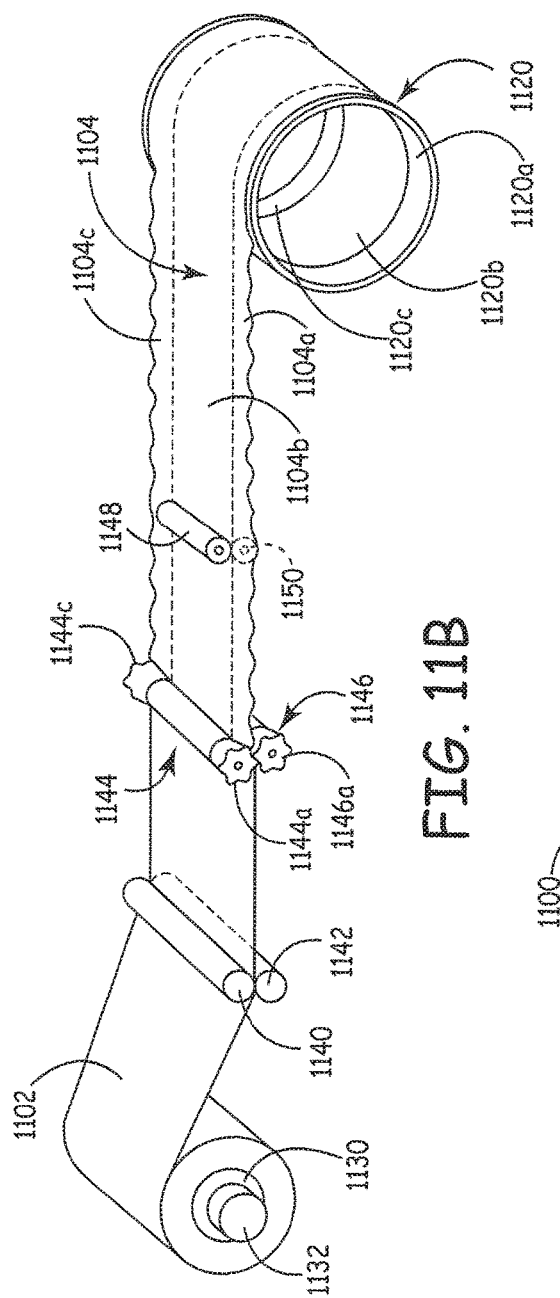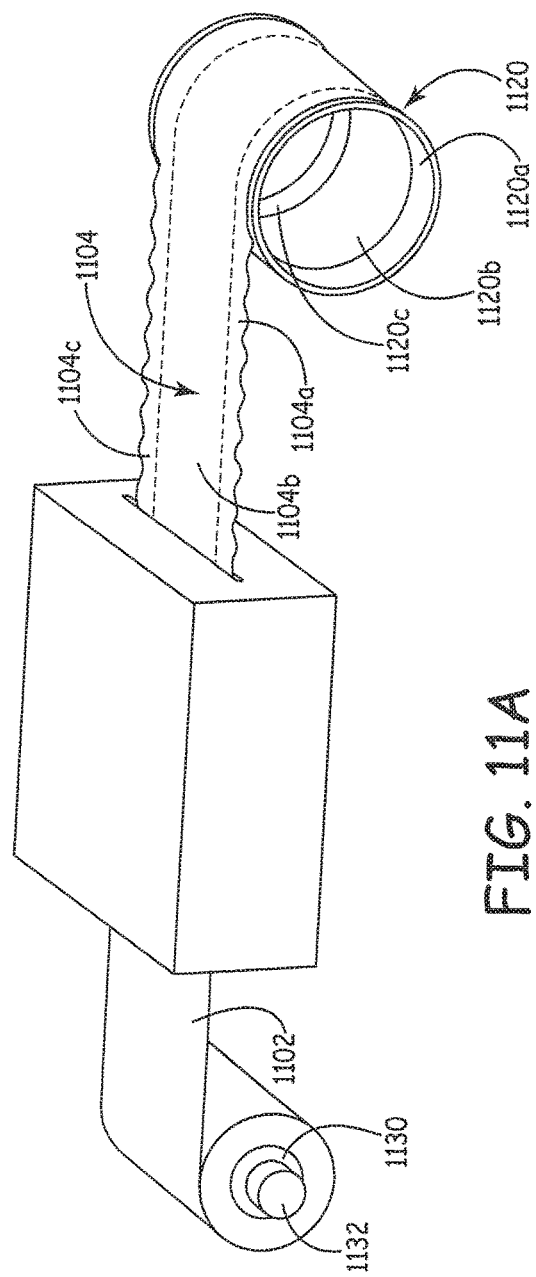

APPARATUS FOR PREFORMING AT LEAST A PORTION OF A MATERIAL

CROSS-REFERENCE TO RELATED APPLICATIONS

This application is a continuation of U.S. patent application Ser. No. 15/050,241, filed Feb. 22, 2016, now U.S. Pat. No. 10,730,227, issued Aug. 4, 2020, which is a divisional of U.S. patent application Ser. No. 12/832,251, filed Jul. 8, 2010, now U.S. Pat. No. 9,266,279, issued Feb. 23, 2016, the disclosure of each of which is hereby incorporated herein in its entirety by this reference.

BACKGROUND

Pre-impregnated (pre-preg) material is used in the formation of high-strength low weight structures, such as, but not limited to, parts used to build aircraft and spacecraft. Pre-preg material is typically made-up of a composite of reinforcing fibers (such as carbon, glass, aramid, and the like) that are bonded together with a resin system. Pre-preg material is typically manufactured in flat sheets that are applied in multiple fiber orientation layers onto surfaces of a tool to form the shape of a desired part. The laminate is subsequently compacted and heat set (cured or fused) into a composite structure. Other methods of hardening or curing the laminate can also be used with some resins including, but not limited to, electron beam cure, microwave cure and ultraviolet light cure. There are various pre-preg materials fiber architectures that include, but are not limited to, woven fabric, unidirectional tape (uni-tape), non-crimp stitched broadgoods, braid, multi-dimensional weave, stretch broken fibers, and strategically stitched materials. A wide variety of resins can be used including, but not limited to, room temperature set resins, thermoset resins, and thermoplastic resins. The application of pre-preg material on tools, which have forming surfaces with at least two different radii of curvature, can be difficult to accomplish without wrinkling the material, folding the material, or requiring the fibers to be cut (darting the material to conform without creating folds or wrinkles); all of which generally reduces structural properties and functionality of the structure.

For the reasons stated above and for other reasons stated below that will become apparent to those skilled in the art upon reading and understanding the present specification, there is a need in the art for a method of conditioning or stretch-forming pre-preg material for effective and efficient application to forming surfaces of a tool having at least two different radii of curvature.

SUMMARY

The above-mentioned problems of current systems are addressed by embodiments of the present disclosure and will be understood by reading and studying the following specification. The following summary is made by way of example and not by way of limitation. It is merely provided to aid the reader in understanding some of the aspects of the disclosure. Although, only a structure is described in the summary, methods are also claimed and described in the application.

In one embodiment, a variable material stretch-forming apparatus is provided. The variable material stretching apparatus comprises a stretch-forming assembly configured to stretch-form at least one section along a width of a sheet of pre-preg material to a longer length than at least one other section along the width of the sheet of pre-preg material before the sheet of pre-preg material is applied to a tool.

BRIEF DESCRIPTION OF THE SEVERAL VIEWS OF THE DRAWINGS

The present disclosure can be more easily understood and further advantages and uses thereof more readily apparent, when considered in view of the detailed description and the following figures in which:

FIG. 7A is an assembled side view of a stretch-forming device of another embodiment of the present disclosure;

FIG. 7B is a close-up view of a section of a belt of the stretch-forming device of FIG. 7A;

FIG. 7C is a partially unassembled side view of the stretch-forming device of FIG. 7A;

FIG. 11A is a side perspective view of a stretch-forming assembly and a roll storage of an embodiment of the present disclosure;

FIG. 11B is a side perspective view of an embodiment of the stretch-forming assembly of FIG. 11A;

In accordance with common practice, the various described features are not drawn to scale but are drawn to emphasize specific features relevant to the present disclosure. Reference characters denote like elements throughout the figures and the text.

DETAILED DESCRIPTION

In the following detailed description, reference is made to the accompanying drawings, which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the spirit and scope of the present disclosure. The following detailed description is, therefore, not to be taken in a limiting sense, and the scope of the present disclosure is defined only by the claims and equivalents thereof.

When flat sheets of pre-preg material are formed into a radial pattern they must be stretched in length as they conform to an increasing radius. This is typically done by hand on a tool surface as material is pressed into place and stretched manually from a smaller radius to a larger radius. Embodiments of the present disclosure create a method of doing this stretching automatically, prior to touching the tool surface. In embodiments, pre-preg material is stretch-formed before laying the material onto the tool surface. This increases the speed at which the material can be formed onto the tool thereby reducing labor content in the lay-up process and improving consistency of the forming by running the material through a machine operation instead of stretching it manually. In an embodiment, specific sections along a width of a sheet of pre-preg material are pre-formed by stretching the specific sections so they will travel a longer path distance on a forming surface of a tool. For a section of material to travel a longer path distance relative to another section of material, it must increase its lengthwise dimension or stretch. There is typically little or no elastic behavior in the longitudinal direction of continuous fibers of the pre-preg material. Generally, stretch of the material comes from stretching the resin matrix that holds the fibers together and spreading the fiber bundles transverse to their longitudinal direction. With off-axis materials, the angle orientation of the fibers can change and the material can reduce in fiber area density to achieve the lengthwise dimensional increase. There may be a corresponding narrowing of width dimension in the stretch section in some embodiments. Examples of pre-preg material that can have sections stretched include, but are not limited to, woven fabrics, off-axis unidirectional tapes, non-crimp stitched broadgoods, braids, multi-dimensional weaves, stretch broken fiber products (off-axis and uni-directional) and strategically stitched materials.

Figure 1:
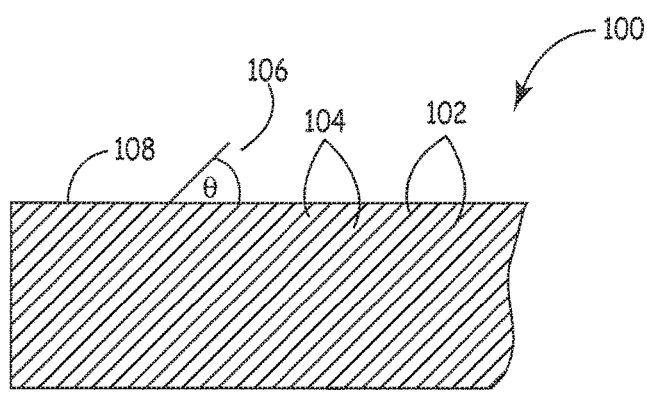
FIG. 1 is a top view example illustration of an off-axis pre-preg material used in embodiments of the present disclosure.
Figure 2:
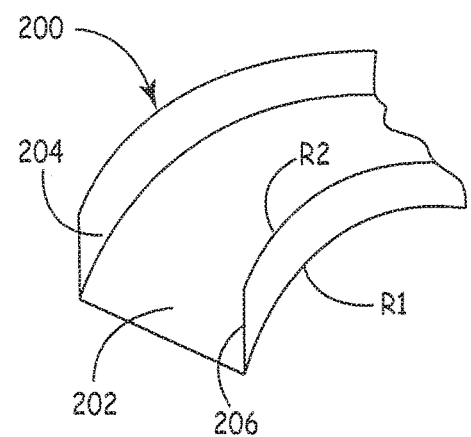
FIG. 2 is a partial side perspective view of a tool having at least two different radii of curvature.

FIG. 1 illustrates a sheet of off-axis pre-preg material 100. In particular, in this example the pre-preg material 100 is uni-tape having spaced fibers 102 that are at a select orientation angle 106 in relation to an edge 108 of the sheet 100 (i.e., the orientation of the fibers 102 are off-axis in relation to the edge 108). The fibers 102 are pre-impregnated with, and held together by, resin 104. FIG. 2 illustrates a portion of a tool 200 that has tool surfaces having at least two different radii of curvature. In particular, tool 200 includes a forming surface 202, which can generally be referred to herein as a "web" or "cylinder" of the tool. In the example in FIG. 2, the tool 200 has a constant radius from its center of revolution. Extending from web 202 are forming surfaces 204 and 206, which both can be generally referred to as "flanges," "tool flanges," or "turned up flanges." Flanges 204 and 206 can have the same or different outer radii of curvature necessitating the same or different amounts of linear stretch of pre-preg material to conform to the surfaces. Referring to flange 206, flange 206 has a first radius of curvature R1 and a second different radius of curvature R2. R2 has a greater radius of curvature than R1. In applying a sheet of pre-preg material (such as the off-axis pre-preg material 100) on the forming surfaces 202, 204, 206 of the tool 200, the pre-preg material 100 must be pressed to extend about flanges 204, 206 of the forming tool. However, even initially applying the pre-preg material 100 to the tool 200 can be a challenge since the shape of the forming surfaces 202, 204, 206 in relation to each other does not lend to the application of a flat sheet of pre-preg material 100 in a conformal manner. Further, it is difficult to get the sheet of pre-preg material 100 to lie on the forming surfaces 202, 204, 206 of the tool 200 in a desired fashion because of the differences of curvature of the radiuses of R1 and R2 of the tool 200 illustrated in FIG. 2. Moreover, pre-preg material 100 that conforms to surface 202 will not conform to surfaces 204 or 206 without stretching or darting to meet the increased radius R2.

Figure 3:
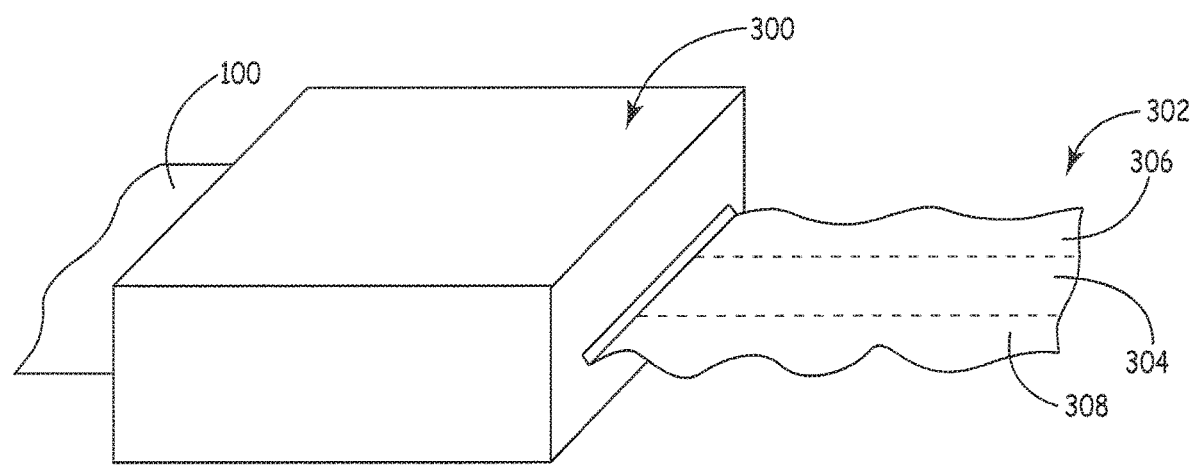
FIG. 3 is a side perspective view of a stretch-forming assembly of one embodiment of the present disclosure.

Referring to FIG. 3, a side perspective view of a stretch-forming assembly 300 of one embodiment is illustrated. The stretching assembly 300 takes the pre-preg material 100 and stretches select sections along a width of the pre-preg material 308 and 306 so that an increase in curvature of radius on a forming surface, such as R2 in relation to R1 can be accommodated. In particular, FIG. 3 illustrates a pre-formed pre-preg material 302 that includes a first section 304 that has not been stretched and sections 306 and 308 that have been stretched to accommodate different radius of curvature, such as the different radius of curvatures present in the forming surfaces 204 and 206 of tool 200 illustrated in FIG. 2. Although FIG. 3 illustrates an embodiment where two sections 306 and 308 of a preformed pre-preg material 302 have been stretched, any number of sections of a pre-formed pre-preg material 302 could be stretched depending on a particular shape of the forming surfaces of a tool. Moreover, the stretching may also occur for a select distance along the length of the material.

Figure 4:
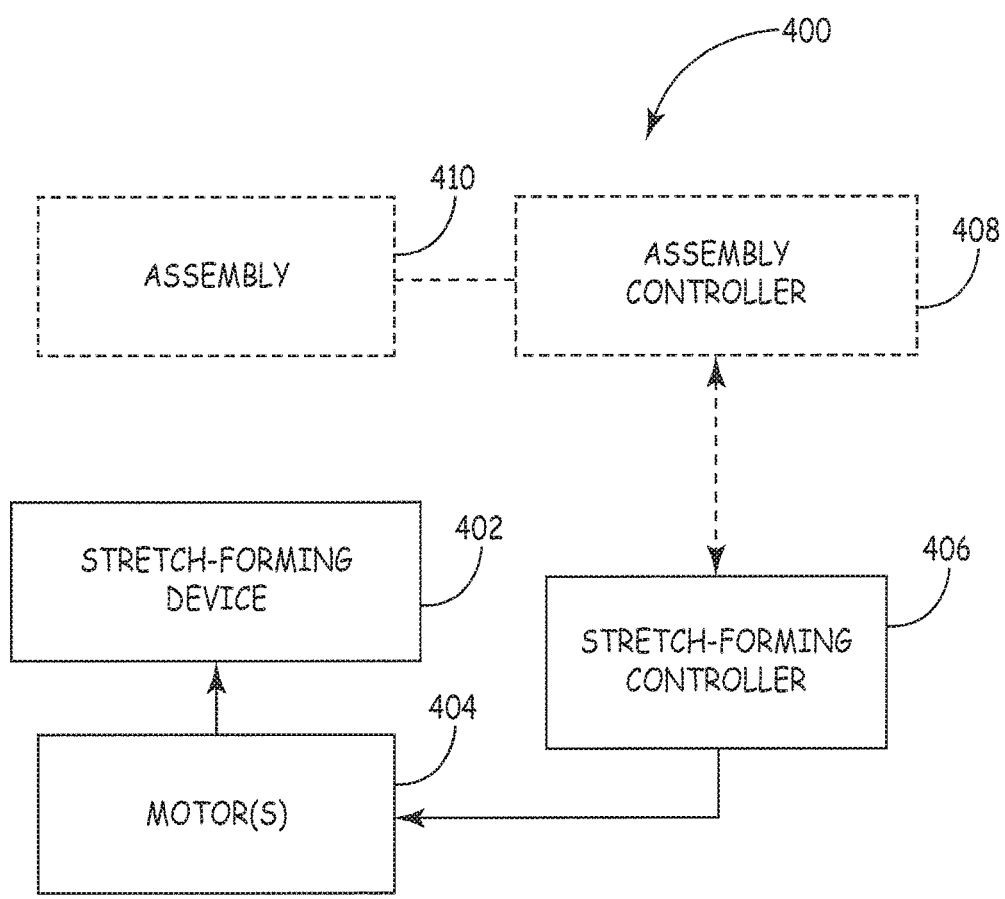
FIG. 4 is a block diagram of a stretch-forming assembly of one embodiment of the present disclosure.
Figure 5:
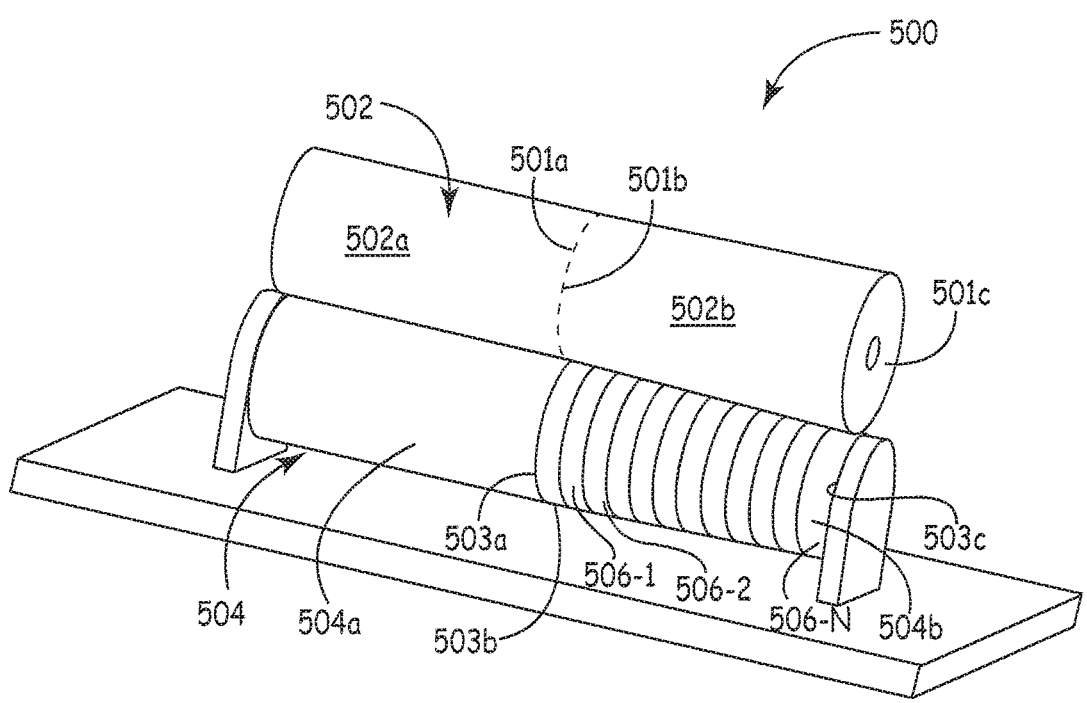
FIG. 5 is a side perspective view of a stretch-forming device of one embodiment of the present disclosure.

FIG. 4 illustrates a block diagram of a stretch-forming assembly 400. In particular, FIG. 4 illustrates a stretch-forming device 402 (embodiments of which are further described below), a motor or motors 404 and a stretch-forming controller 406. The controller 406 controls the motor or motors 404 to activate the shaping device 402. In one embodiment, the stretch-forming controller 406 is in communication with an assembly controller 408 that allows synchronization between the stretch-forming device 402 and an assembly 410. Examples of assemblies 410 that could be synchronized with the stretch-forming device 402 are the forming assembly 1000 of FIG. 10 and the storage core 1120 of FIGS. 11A and 11B, each of which is described in further detail below. In FIG. 5, an example stretch-forming device 500 of one embodiment is illustrated. In particular, FIG. 5 is a side perspective view of a roller stretch-forming device 500. The roller stretch-forming device 500 includes a first roller 502 and a second roller 504. The first roller 502 is positioned adjacent the second roller 502 such that a surface of the first roller 502 engages a surface of the second roller 504. In particular, the first roller 502 and the second roller 504 are positioned so that a sheet of pre-preg material can pass between the first roller 502 and the second roller 504, as the first and second roller 502 and 504 rotate. In the embodiment of FIG. 5, the first roller 502 includes a first cylindrical shaped roller section 502a and a second conical roller section 502b. The second roller 504 similarly includes a first cylindrical roller section 504a and a second conical roller section 504b. The first cylindrical roller section 504a of the second roller 504 engages the first cylindrical roller section 502a of the first roller 502. The second conical shaped section 504b of the second roller 504 engages the second conical shaped section 502b of the first roller 502.

In the embodiment of FIG. 5, the second conical section 502b of the first roller 502 includes a first end 501b and a second end 501c. The first end 501b of the second conical section 502b abuts a first end 501a of the first cylindrical section 502a. The diameter of the first cylindrical section 502a of the first roller 502 is approximately equal to the diameter at the first end 501b of the second conical section 502b of the first roller 502. The second end 501c of the second conical section 502b of the first roller 502 has a greater diameter than the first end 501b of the second conical section 502b of the first roller 502. The second conical section 504b of the second roller 504 includes a first end 503b and second end 503c. The first end 503b of the second conical section 504b of the second roller 504 is positioned adjacent a first end 503a of the first cylindrical section 504a of the second roller 504. The first end 503b of the second conical section 504b of the second roller 504 has a diameter approximately equal to the diameter of the first cylindrical section 504a of the second roller 504. The second end 503c of the second conical section 504b of the second roller 504 has a smaller diameter than the first end 503b of the conical section 504b of the second roller 504. Hence, the shape of the second conical section 504b of the second roller 504 conforms to the shape of the second conical section 502b of the first roller 502. In the embodiment of FIG. 5, a section of pre-preg material that passes between the second conical sections 502b of the first roller 502 and the second conical section 504b of the second roller 504 is stretched in relation to a remaining section of pre-preg material passing between the first cylindrical section 502a of the first roller 502 and the first cylindrical section 504a of the second roller 504. Hence, in this embodiment only one section of pre-preg material is stretched. In one embodiment, the second conical section 504b of the second roller 504 is segmented into segments 506-1 through 506-n, as illustrated in FIG. 5. Further, in one embodiment each of the segments 506-1 through 506-n is designed to move independently of each other such that different rotational speeds in different segments 506-1 through 506-n can be achieved. This further enhances stretching of the material between the second conical sections 502b and 504b. An embodiment, further illustrating independent moving segments of a roller is provided below in regard to FIG. 8. Roller 502 is driven by a motor, such as motor 404 illustrated in FIG. 4. Rollers 504, in one embodiment, are not driven and are free to rotate at speeds related to geometry of rollers 502. Further, some embodiments apply a back tension on the pre-preg material as the stretch-forming device 500 selectively stretches sections of the pre-preg material to help prevent steering issues that can occur when the pre-preg material passes through the stretch-forming device 500. Examples of assemblies that can apply the back tension are the supply roll-off 1130 of FIGS. 11A and 11B and the nip rollers 1220 and 1222 of FIG. 12A, which are further described in detail below.

Figure 6:
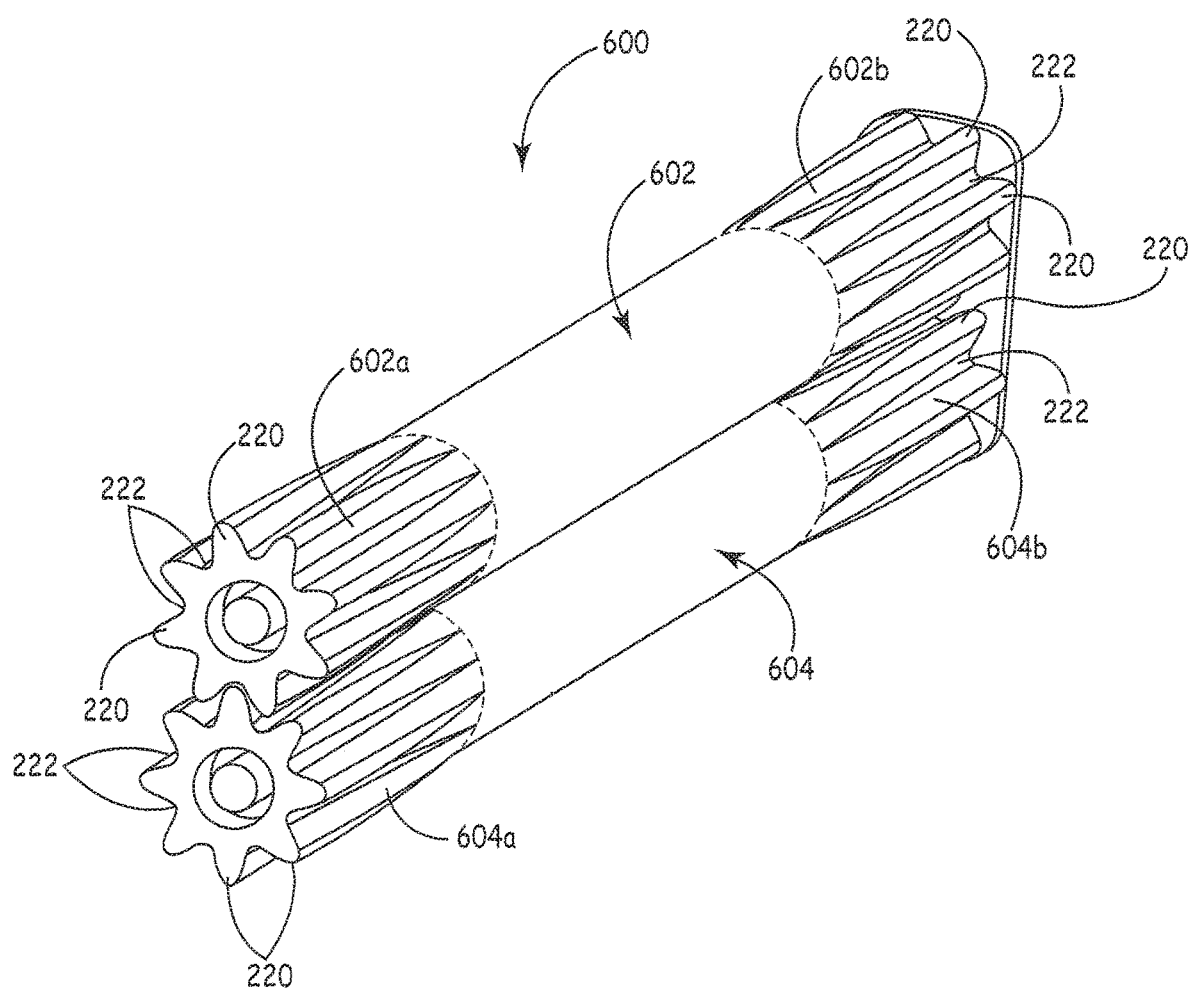
FIG. 6 is a side perspective view of another embodiment of a stretch-forming device of the present disclosure.

Referring to FIG. 6, another embodiment of a stretch-forming device 600 is illustrated. In particular, FIG. 6 illustrates a gear stretch-forming device 600. The gear stretch-forming device 600 includes a cylindrically shaped first roller 602 and cylindrically shaped second roller 604 (i.e., a pair of mating rollers 602 and 604). The first roller 602 includes a first gearing end 602a and a second gearing end 602b. The second roller 604 also includes a first gearing end 604a and a second gearing end 604b. Each gearing end 602a and 602b of the first roller 602 and each gearing end 604a and 604b of the second roller 604, respectively, includes a plurality of rounded teeth 220 (or shaped gear teeth) separated by a plurality of grooves 222. In one embodiment, the teeth 220 are shaped irregularities similar to shaped gear teeth. As illustrated in FIG. 6, the gearing of the first roller 602 is mated with the gearing of the second roller 604. In particular, teeth 220 of gear end 602a of the first roller 602 are received in grooves 222 of gear end 604a of the second roller 604 and teeth 220 of the first gear end 604a of the second roller 604 are received in grooves 222 of the first gear end 602a of the first roller 602. Likewise, teeth 220 of the second gear end 602b of the first roller 602 are received in grooves 222 of the second roller 604 and teeth 220 of the second gear end 604b of the second roller 604 are received in grooves 222 of the second gear end 602b of the first roller 602. In this embodiment, as a sheet of pre-preg material passes between the first and second rollers 602 and 604 the respective gear ends 602a and 604a of the first and the second rollers 602 and 604 stretch a first end section of the pre-preg material. The second roller ends 602b and 604b of the first and second rollers 602 and 604 stretch a second section of the pre-preg material. Hence, in this embodiment two different sections of pre-preg material are stretched with the gear stretching device 600. Both gears for first roller 602 and second roller 604 are motor driven to maintain synchronized mating of teeth 220 and valleys 222 in one embodiment. In one embodiment, teeth 220 and valleys 222 do not physically contact so as to allow the pre-preg material to move freely widthwise as it is stretched in the lengthwise direction moving through the convoluted path created by teeth 220 and valleys 222. In another embodiment, the pre-preg material is gripped along the entire length of the constant cross-section, and along a contact line in the geared sections. Moreover, in another embodiment, the distance between the teeth 220 and valleys 222 of opposed rollers 602 and 604 are adjustable.

FIGS. 7A-7C illustrate yet another embodiment of a stretch-forming device 700. In particular, FIGS. 7A and 7C illustrate a belt stretch-forming device 700. FIG. 7A illustrates an assembled belt stretch-forming device 700 and FIG. 7C illustrates the belt stretch-forming device 700 partially unassembled. The belt stretch-forming device 700 includes a first belt member 701 and second belt member 703. The first belt member 701 and the second belt member 703 are positioned to pass a sheet of pre-preg material 720 between themselves, as illustrated in FIG. 7A. The first belt member 701 includes an endlessly looped belt 702 and an endlessly looped stretching belt 704. Belt 702 and stretching belt 704 are engaged with rotating support drums 710 and 712. The second belt member 703 includes an endless looped belt 706 and an endlessly looped stretching belt 708. Belt 706 and stretching belt 708 are engaged with rotating support drums 714 and 716, respectively. The close-up view 750 of FIG. 7A illustrates that in one embodiment, the belts 702 and 706 include spikes 752. The spikes 752 are designed to firmly grab the pre-preg material 702, while not harming the pre-preg material 702. Referring to FIG. 7C, the rotating support drums 710 and 712, engaged to the first belt member 701, are segmented into rotating support drum sections 710a and 710b and rotating support drum sections 712a and 712b. Belt 702 engages rotating support drums sections 710a and 712a, respectively. Stretching belt 704 is engaged to rotating support drums 710b and 712b, respectively. Stretching belts 704 and 708 each include a plurality of fins 711 (or ribs). The fins 711 are used to stretch a section of the sheet of pre-preg material 720. Referring back to FIG. 7A, the fins 711 on the stretching belt 704 and 708 are positioned so they stagger each other as the sheet of pre-preg material 720 is pulled between the first belt member 701 and the second belt member 703 as the first and second belt members 701 and 703 are rotated. As FIG. 7B illustrates, the fins 711 of the stretching belts 704 and 708, stretch a section 720a of the sheet of pre-preg material 720. Hence, as the sheet of pre-preg material 720 is moved between the first belt member 701 and the second belt member 703 of the belt stretching device 700, section 720a of the sheet of pre-preg material 720 is stretched by the fins 711. Further illustrated in FIGS. 7A and 7C, a first pressure platen 730 is positioned within stretching belt 704 and a second pressure platen 732 is positioned in stretching belt 708. The pressure platens 730 and 732 apply pressure on the respective stretching belts 704 and 708 to stretch the pre-preg material 720. In embodiments, the pressure platens 730 and 732 are adjustable so that the amount of pressure can be selected. Also illustrated in FIG. 7C, is a third pressure platen 734 designed to apply pressure to belt 702. A similar pressure platen is designed to apply pressure to belt 706. Pressure platen 734 is also adjustable, in one embodiment. In another embodiment, belts 702 and 704 of the first belt member 701 are integral as one unit with rollers 710a, 710b and 712a, 712b of the first belt member 701 also being integral as one unit. Similarly, the second belt member 703, in one embodiment, is integral as one unit. In yet other embodiments, more than two belt and roller assemblies per set are used with more complex forming work.

Figure 8:
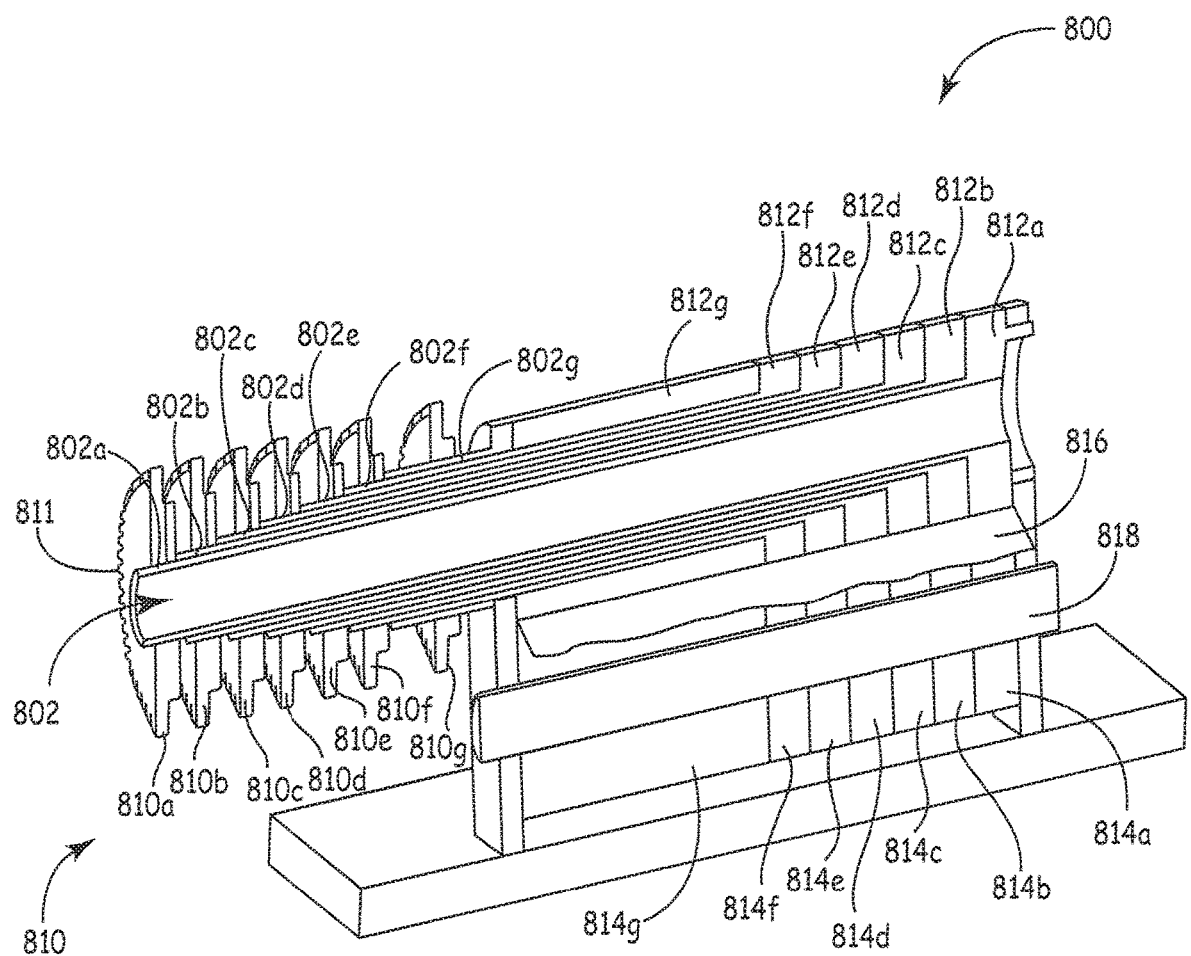
FIG. 8 is a cross-sectional side perspective view of yet another embodiment of a stretch-forming device of the present disclosure.

Yet still another embodiment of a stretch-forming device 800 is illustrated in FIG. 8. In particular, FIG. 8 illustrates a segmented roller stretch-forming device 800. This embodiment includes a first drive system 810 that is attached to a shaft system 802. The drive system 810 is shown as using gears, but could be driven by other means. The drive system 810 includes gears 810a through 810g that are coupled, respectively, to shafts 802a through 802g of the shaft system 802. Shafts 802a though 802g are, in turn, attached to segmented driven rollers 812a through 812g. The segmented driven rollers 812a through 812g are in contact with segmented non-driven rollers 814a through 814g. The non-driven rollers 814a through 814g are rotationally mounted on shaft 818. A sheet of pre-preg material 816 is passed between the driven rollers 812a through 812g and the respective non-driven rollers 814a through 814g. In the embodiment of FIG. 8, gears 810a through 810g are driven by individual motors via gear teeth 811 that drive each respective roller 812a through 812g at individual speeds to control an amount of pre-preg stretch in those corresponding regions. For example, roller 812a could be driven at a rotational speed that is different than the rotational speed at which roller 812b is driven, which, in turn, could be different than the rotational speed at which roller 812c is driven, and so-forth. This allows a sheet of pre-preg material 816 passing between the driven rollers 812a through 812g and the non-driven rollers 814a through 814g to be selectively stretched in select sections. This embodiment allows the amount of stretch-forming in the material to vary along the width and to vary along the length of the material simultaneously, and to be programmed for complex geometry parts requiring different degrees of stretch-forming in different areas of the product. Driving individual segmented rollers is accomplished with a number of different drive means. For example, separate individual motors could be used. In another example, separate gear ratios connected to a common motor drive are used.

Figure 9:
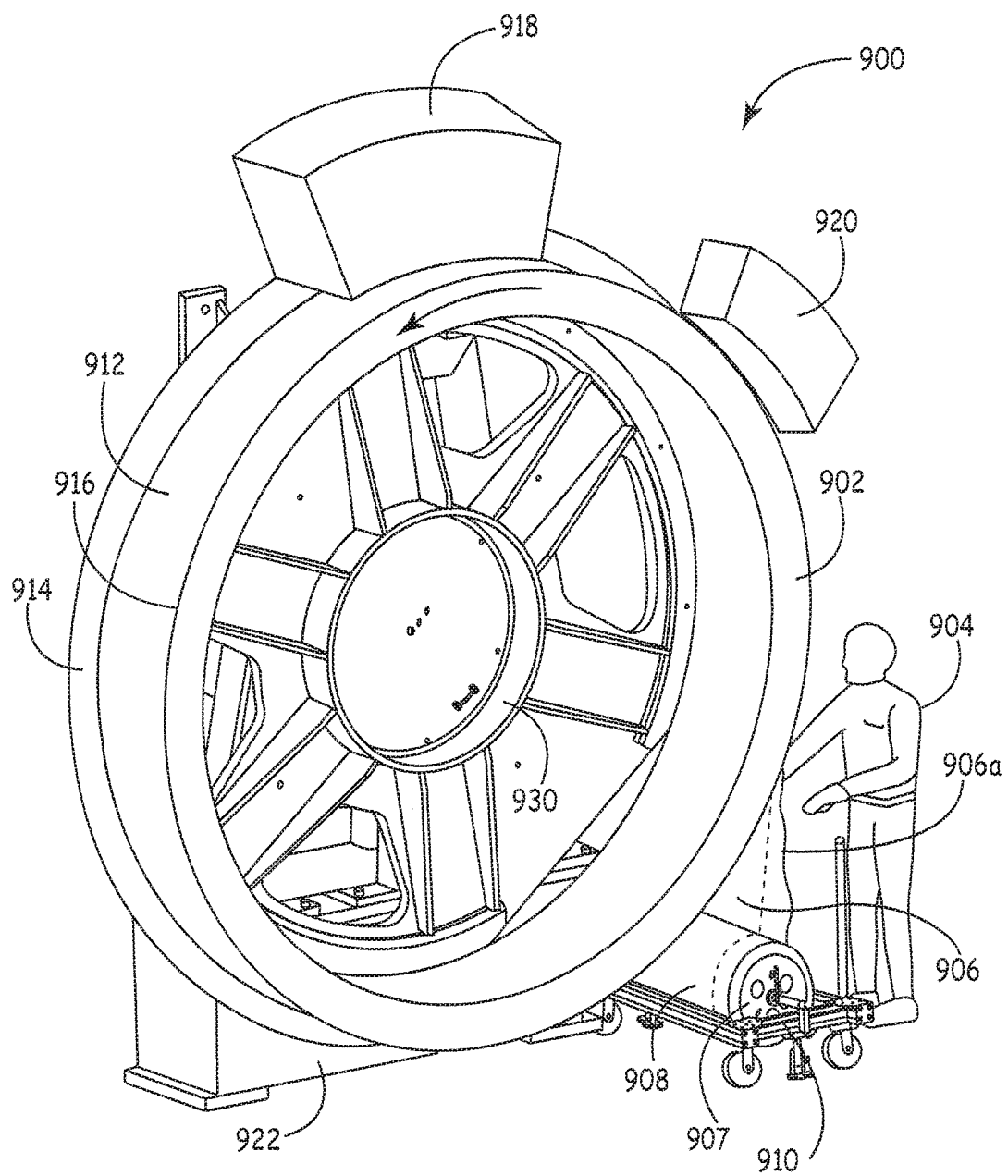
FIG. 9 is a side perspective view of a composite structure forming assembly using a roll of material prepared with one embodiment of the present disclosure.

Referring to FIG. 9, a forming assembly 900 using pre-preg material 906 that has a stretch-formed section 906a is illustrated. In this embodiment, the sheet of pre-preg material 906 will have another stretch-formed section (not shown) along an opposite edge (not shown) to accommodate the forming surfaces 912, 914 and 916 of the tool 902. A roll 908 of stretch-formed pre-preg material can be stored on a roll-off 907, prior to use. The roll-off 907 is rotationally coupled to roll holder 910. An operator 904 aligns the material with the tool 902 to place the pre-preg material 906 on the tool 902. Tool 902 rotates about a central hub 930 that is rotationally coupled to a base 922. A placement device 920, places the pre-preg material 906 on forming surfaces 912, 914, 916 of the tool 902. A forming head 918 presses the pre-preg material 906 onto the forming surfaces 912, 914, 916, of the tool 902, as the tool 902 rotates about the central hub 930. One benefit of the stretched sections 906a of the pre-preg material 906 is when the operator 904 aligns the material and starts placement of the pre-preg material 906 on the forming surfaces 912, 914 and 916 of the tool 902, as the stretched edge sections 906a allow the pre-preg material 906 to be easily laid up on the forming surfaces 912, 914, 916. In particular, a mid-portion of the pre-preg material 906 will lay up on forming surface 912, while sections near the edge of the pre-preg material 906, such as edge section 906a, that are stretched will lay up on the respective flange forming surfaces 914 and 916 and will remain on the forming surfaces 914 and 916 until the forming head 918 presses the pre-preg material 906 onto the forming surfaces 912, 914, 916 of the tool 902. Without the stretching proximate the edge of the pre-preg material 906, the pre-preg material 906 will tend to flip over on itself proximate the edges of the pre-preg material 906. That is, without stretching the edges of the pre-preg material 906, the edges of the pre-preg material 906 will not initially conform to forming surfaces 914 and 916 of the tool 902 and fold over onto itself on forming surface 912. Also, the stretching of the edges, such as edge 906a, of the pre-preg material 906 stretches the pre-preg material 906 to accommodate the differences in radii on the flange forming surfaces 914 and 916.

Figure 10:
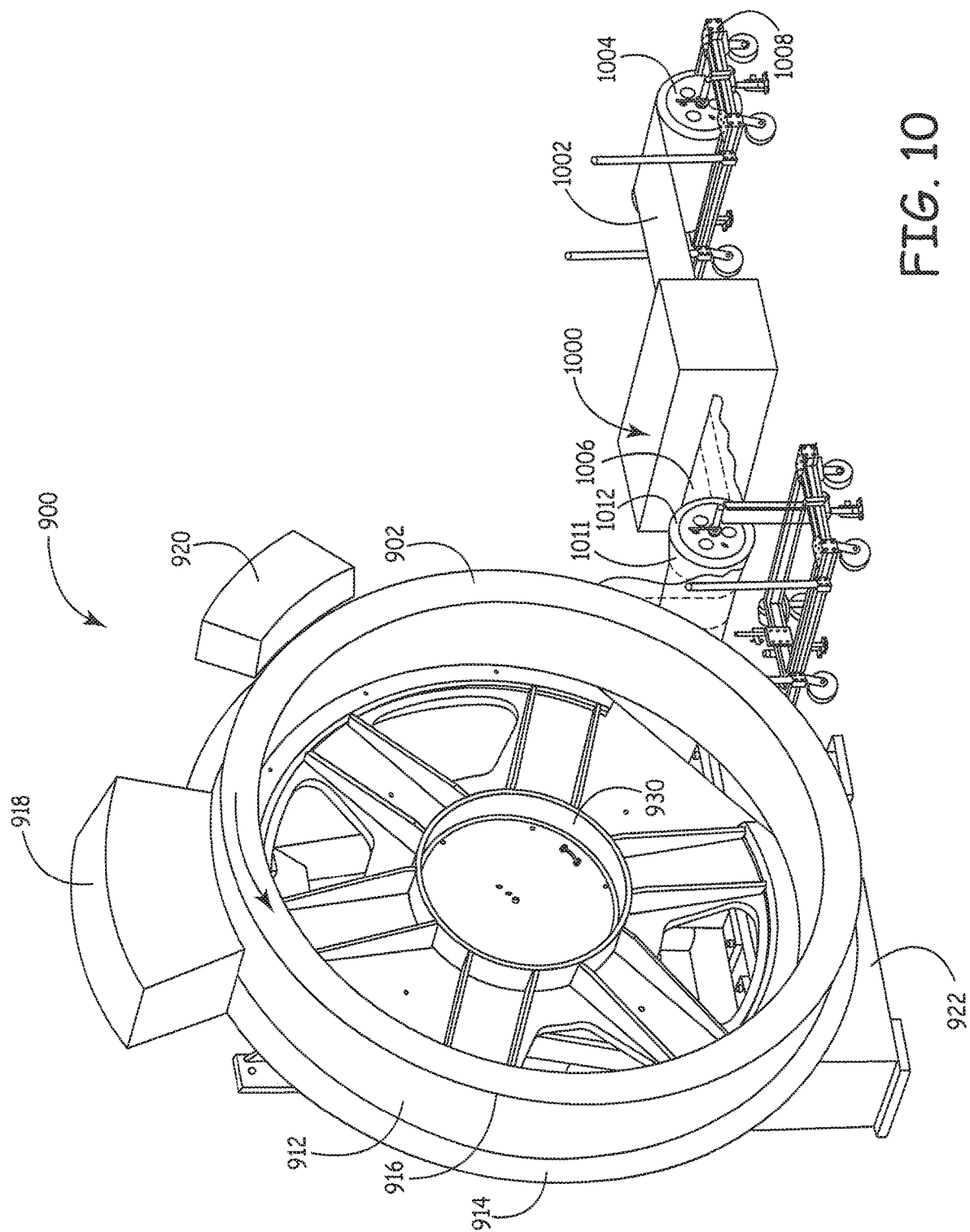
FIG. 10 is a side perspective view of a composite structure forming assembly incorporating a pre-preg stretch-forming assembly, in-line with a roll of unstretched material in one embodiment of the present disclosure.

FIG. 10 illustrates an implementation of a stretch-forming assembly 1000 with the forming assembly 900, of an embodiment (e.g., FIG. 9). A roll of pre-preg material 1002 is stored on roll-off 1004, which is rotationally coupled to supply base 1008. The pre-preg material 1002, in this embodiment, is passed through stretch-forming assembly 1000. Exemplary embodiments of the stretch-forming assembly 1000 are described below with respect to FIGS. 11A-16. The stretch-formed pre-preg material 1006 then passes around guide roller 1012, which directs the stretch-formed pre-preg material 1006 on the tool 902. The stretch-formed pre-preg material 1006 is then formed on the tool 902, as described above in regard to FIG. 9. In the embodiment of FIG. 10, the guide roller 1012 includes conical ends 1011 that help retain the form of the stretch-formed pre-preg material 1006 before it is applied to the tool 902.

FIG. 11A illustrates an embodiment of a stretch-forming assembly 1100, a supply roll-off 1130 and a storage core 1120. In this embodiment, the supply roll-off 1130 includes a tension motor 1132 that supplies a select amount of back tension to the supply pre-preg material 1102 to assist in the stretch-forming process and to keep the pre-preg material 1102 aligned with the stretch-forming assembly 1100.

Stretch-formed pre-preg material 1104 includes a non-stretched section 1104b and stretched sections 1104a and 1104c. Although this example includes the non-stretched section 1104b positioned between the stretched sections 1104a and 1104c, any desired arrangement and any number of stretched and non-stretched sections can be used. In this embodiment, the stretch-formed pre-preg material 1104 is stored on the storage core 1120. The storage core 1120 in this embodiment includes tapered end sections 1120a and 1120c and a mid-section 1120b that correspond to the respective sections 1104a, 1104b and 1104c of the stretch-formed pre-preg material 1104. In particular, the tapered end sections 1120a and 1120c are used to retain the stretching in the stretch-formed pre-preg material 1104 when stored for a period of time. For example, roll-off 907 of FIG. 9 in one embodiment is the storage core 1120 of FIG. 11A to retain the stretch-formed pre-preg material 1104 in the desired stretch-formed shape. FIG. 11B illustrates a stretch-forming device of the stretch-forming assembly 1100 of FIG. 11A. The stretch-forming device of this embodiment includes a pair of first nip rollers 1140 and 1142 and a pair of secondary nip rollers 1148 and 1150 that pass the pre-preg material 1102 and 1104. A pair of stretch-forming rollers 1144 and 1146 is positioned between the pair of first nip rollers 1140 and 1142 and the pair of secondary nip rollers 1148 and 1150. The pair of stretch-forming rollers 1144 and 1146 (mating rollers) each have end forming sections 1144a, 1146a, 1144c and 1146c (not visible in FIG. 11B) that stretch-form select sections 1104a and 1104c of the pre-preg material 1102 into stretch-formed pre-preg material 1104 as the pre-preg material 1102 passes between the stretch-forming rollers 1144 and 1146. The secondary nip rollers 1148 and 1150 are of a select length so that they engage only the non stretch-formed section 1104b of the stretch-formed pre-preg material 1104 as they pass the stretch-formed pre-preg material 1104. This prevents the secondary nip rollers 1148 and 1150 from deteriorating the stretch-formed sections 1104a and 1104c. In one embodiment, the pair of first nip rollers 1140 and 1142, the constant diameter portion of the pair of second rollers 1144 and 1146, and the pair of third nip rollers 1148 and 1150 are driven at a synchronized speed. The stretch-formed re-preg material 1104 is wound up on the shaped storage core 1120.

Figure 12A:
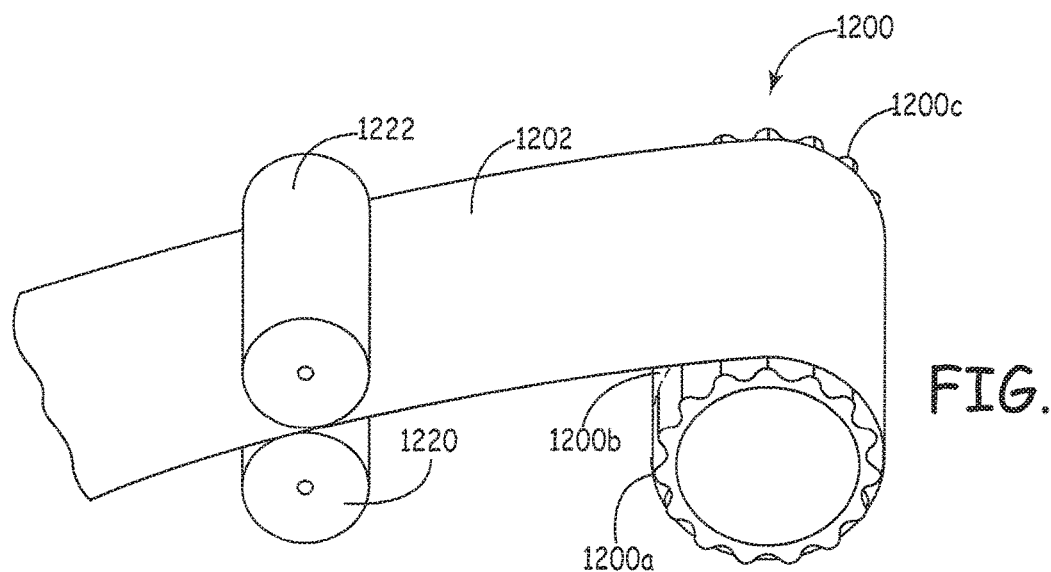
FIG. 12A is a side perspective view of a shaped-core and nip rollers of a stretch-forming assembly of another embodiment of the present disclosure.
Figure 12B:
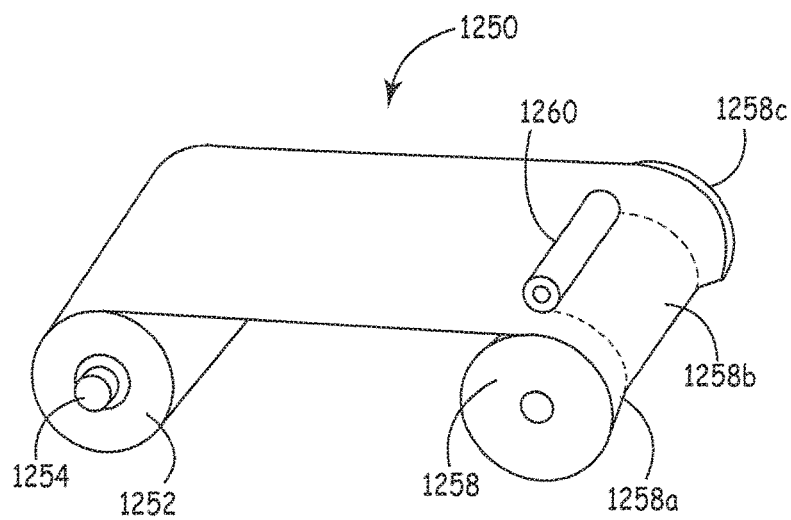
FIG. 12B is a side perspective view of a stretch-forming assembly with a shaped core of another embodiment of the present disclosure.
Figure 13:
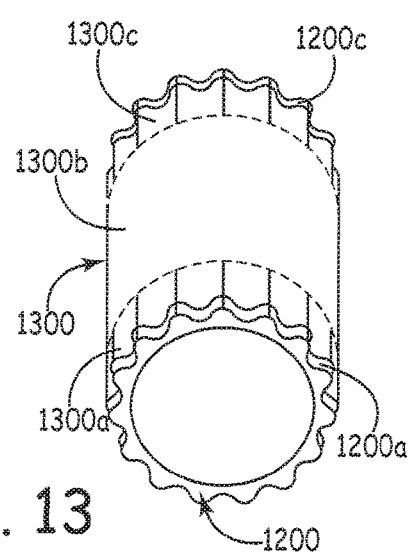
FIG. 13 is a side perspective view of the shaped-core of the stretch-forming assembly of FIG. 12A with at least one layer of stretch-formed material used in another embodiment of the present disclosure.
Figure 14:
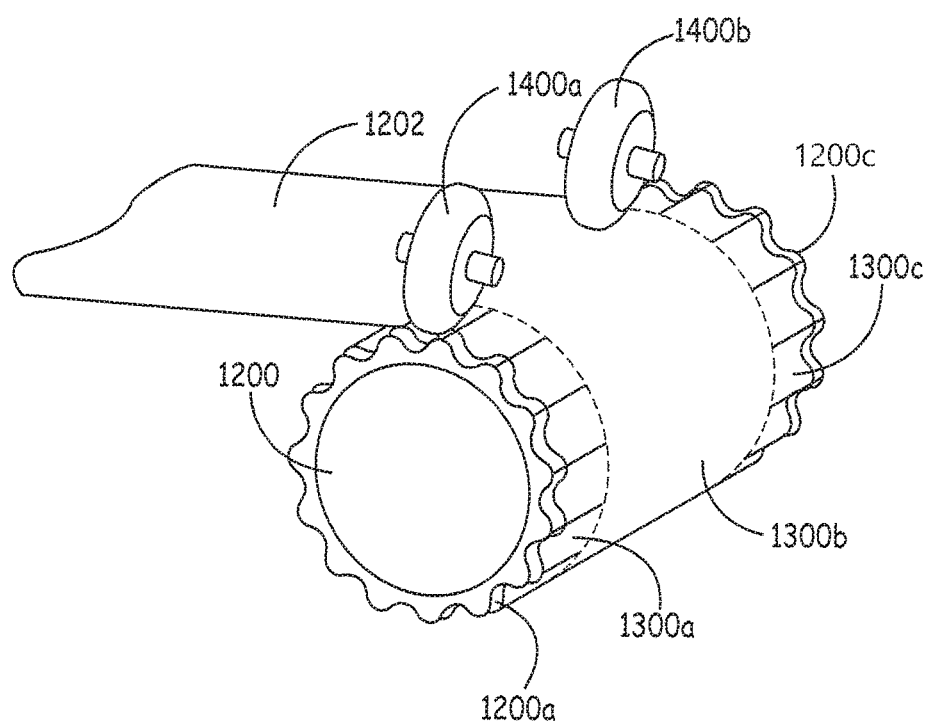
FIG. 14 is a side perspective view of the shape-core of FIG. 12A with transverse forming rollers of one embodiment of the present disclosure.

Referring to FIG. 12A, another embodiment of a stretch-forming device is illustrated. In this embodiment, the stretch-forming device is a shaped core 1200 that can also be used to store the stretch-formed pre-preg material. The embodiment of FIG. 12A illustrates a pair of nip rollers 1220 and 1222 that provide back tension when applying the pre-preg material to the shaped core 1200. As discussed above, the back tension assists in the stretching and forming process and keeping the material aligned with the stretch-forming device 1200. As illustrated in FIG. 12A, the shaped core 1200 includes outer stretch-form sections 1200a and 1200c and a mid non-stretching section 1200b. In an embodiment, the greatest diameter of the outer stretch-form sections 1200a and 1200c is equal to the diameter the mid-non-stretching section 1200b. This allows the flat pre-preg material to be aligned when it is rolled onto the shaped core 1200. FIG. 12B illustrates another embodiment of a stretch-forming device 1250 that uses a shaped core 1258 to form stretch-formed pre-preg material. In this embodiment, a tension motor 1254 controls the distribution of pre-preg material 1252 to the shaped core 1258. The shaped core 1258, in this embodiment, includes outer conical shaped stretch-forming sections 1258a and 1258c and a mid non-stretching section 1258b. A nip roller 1260 is used to press a mid-portion of the pre-preg material 1252 onto the mid non-stretching section 1258b of the shaped core 1258. In operation, the shaped core 1258 is rotated to draw the pre-preg material 1252 onto the shaped core 1258. Tension motor 1254 keeps tension in the pre-preg material 1252 to help form the pre-preg material 1252 and maintain an alignment of the pre-preg material 1252 onto the surface sections of the shaped core 1258. The nip roller 1260 keeps the mid-portion of the pre-preg material 1252 in place while the outer portions of the pre-preg material 1252 are stretch-formed by the respective outer conical shaped stretch-forming sections 1258a and 1258b of the shaped core 1258. FIG. 13 illustrates, at least one layer of stretch-formed pre-preg material 1300 on the shaped core 1200. Hence, any number of layers of the pre-preg material can be placed on the shaped core 1200. The stretch-formed pre-preg material 1300 includes outer shaped sections 1300a and 1300c and a non-stretched mid-section 1300b. Various methods can be used to stretch-form the pre-preg material 1202 into outer stretch-form sections 1200a and 1200c of the shaped core 1200. For example, the shaped core 1200 with material 1202 could be subject to a vacuum bag, a vacuum bag and heat, or a vacuum bag with added external pressure. Other methods include physical pressing devices (motion compaction mechanisms), such as the transverse rollers 1400a and 1400b of FIG. 14. In this embodiment, the transverse roller 1400a and 1400b press respective sections of the pre-preg material 1202 in the valleys of the outer stretch-form sections 1200a and 1200c. The transverse rollers 1400a and 1400b move in a transverse direction in regard to the direction the pre-preg material 1202 is rolled onto the shaped core 1200.

Figure 15:
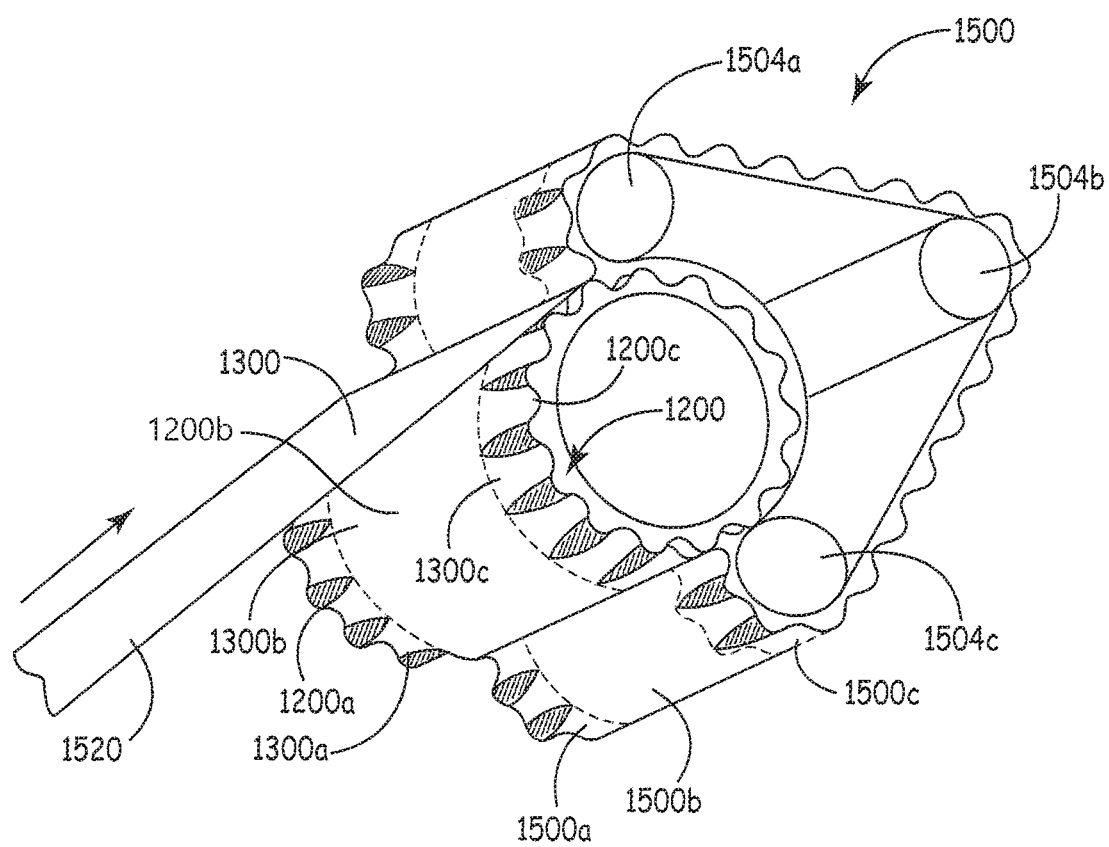
FIG. 15 is a side perspective view of the shape-core of FIG. 12A with a forming track of one embodiment of the present disclosure.
Figure 16:
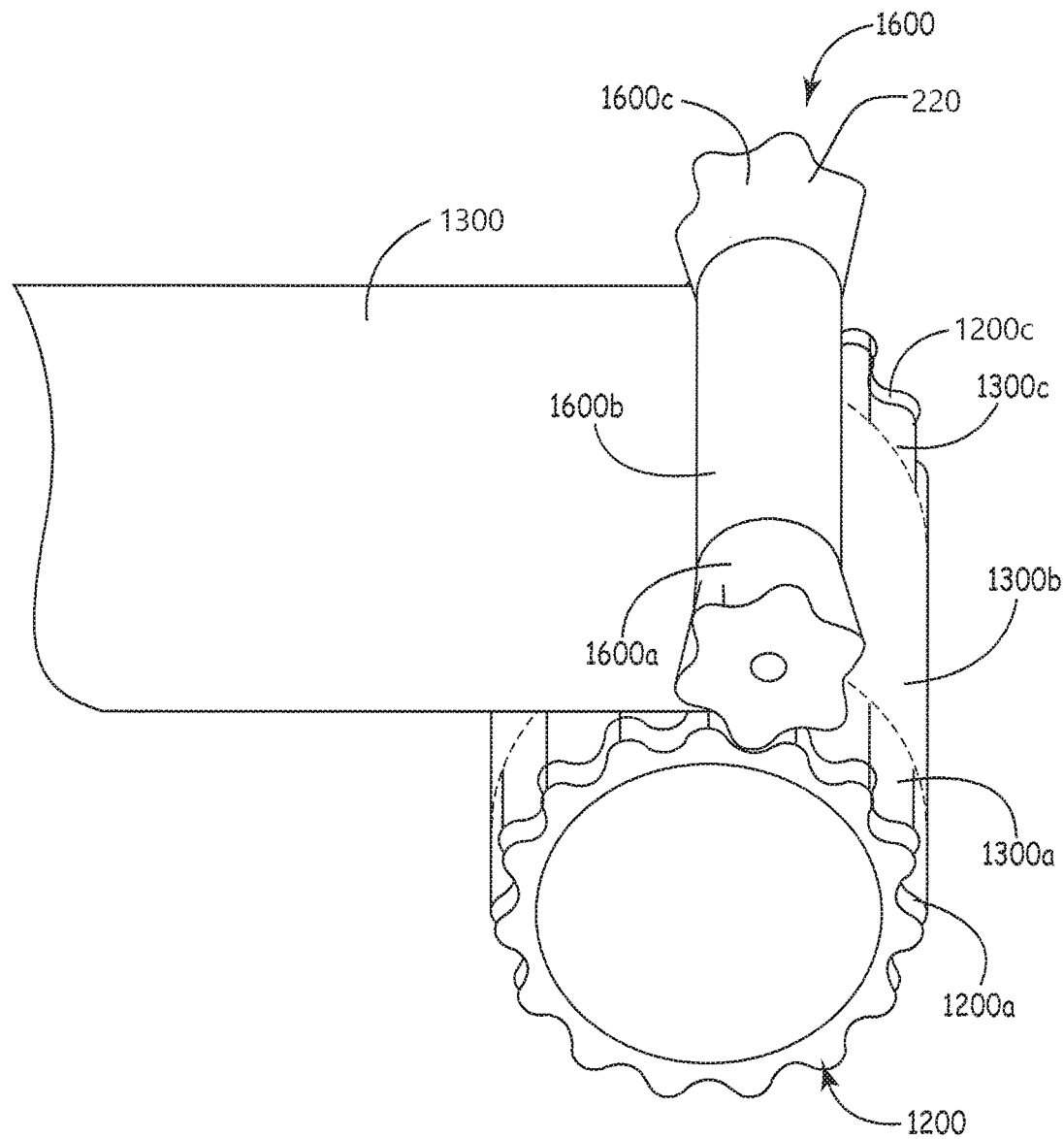
FIG. 16 is a side perspective view of the shaped-core of FIG. 12A with a forming gear of one embodiment of the present disclosure.

Another example of a stretch-forming device using a physical pressing device is illustrated in FIG. 15. In this embodiment, a belt 1500 is used as a physical pressing device to stretch-form pre-preg material 1520 on a shaped core 1200. The belt 1500 has outer press-forming sections 1500a and 1500c and a mid-section 1500b that are complementary in shape to respective outer stretch-form sections 1200a and 1200c and the mid non-stretching section 1200b of the shaped core 1200. The outer press-forming sections 1500a and 1500c of the belt 1500 press respective sections of the pre-preg material 1300 in the valleys of the outer stretch-form sections 1200a and 1200c of the shaped core 1200 to form the stretch-formed pre-preg material 1300, which in this embodiment is wrapped around the shaped core 1200. The belt 1500, in this embodiment, is an endlessly looped belt that moves about rotational idler rollers 1504a, 1504b and 1504c. Idler roller 1504b controls a desired belt tension to keep the belt 1500 engaged intimately with the shaped core 1200 (or roller) and the applied pre-preg material 1520. As discussed above, the stretch-formed pre-preg material 1300 can then be stored on the shaped core 1200 until use. Here again, as with all embodiments, the placement and number of the stretch-form sections 1200a and 1200c of the shaped core 1200 and the corresponding stretching sections 1500a and 1500c can be selected in any manner to achieve a desired outcome. Still another example of a physical pressing device (motion compaction mechanism) is illustrated in FIG. 16. In this embodiment, a roller 1600 physical pressing device is used. The roller 1600 has outer press-forming sections 1600a and 1600c that are complementary in shape to the outer stretch-forming sections 1200a and 1200c of the shaped core 1200. In one embodiment, the outer stretch-forming sections 1200a and 1200c are a plurality of rounded teeth 220 (or shaped gear teeth) separated by a plurality of grooves. The outer press-forming sections 1600*a* and 1600*c* of the roller 1600 press respective sections 1300*a* and 1300*c* of the pre-preg material 1300 in the valleys of the outer stretch-form sections 1200*a* and 1200*c* to form the stretch-formed pre-preg material 1300. The roller 1600 further has a center section 1600*b* that is complementary in shape to center section 1200*b* of the shaped core 1200. As a result, the stretch-formed pre-preg material 1300 is formed to have outer shaped sections 1300*a* and 1300*c* and a non-stretched mid-section 1300*b*.

Figure 17:
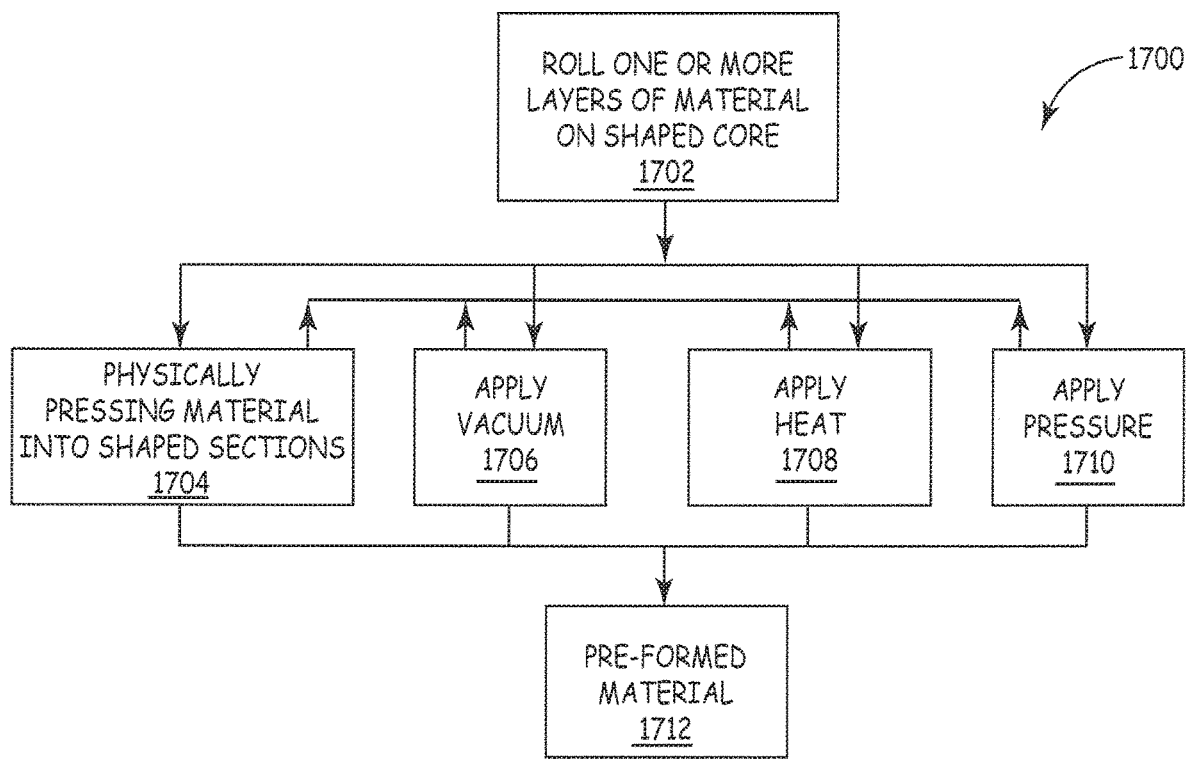
FIG. 17 is a forming flow diagram of one embodiment of the present disclosure.

FIG. 17 illustrates a process flow diagram 1700 that can be used with the shaped core 1200, as described above. As this process starts, one or more layers of pre-preg material are initially rolled on the shaped core (1702). To stretch select sections of the pre-preg material about the sheet of pre-preg material's width, several methods can be used either alone, or in combination. The methods include physically pressing the select sections of pre-preg material into stretching sections of the shaped core (1704), applying a vacuum (1706), applying heat (1708) and applying atmospheric pressure (1710). As stated above, any single method or any combination in any sequence can be used to form the pre-formed (or stretch-formed) pre-preg material (1712). For example, in one embodiment only the physical pressing (1704) is used. In another embodiment, the pre-preg material is physically pressed (1704) and then placed in an autoclave that applies a vacuum (1706), heat (1708) and pressure (1710). Further, in another example embodiment physical pressure (1704) and heat (1708) are applied to the one or more layers of pre-preg material on the shaped core (1702) separately. The shaped core is then vacuumed bagged and pressure (1710) and vacuum (1706) are applied to form the pre-formed pre-preg material (1712). In still another example embodiment, physical pressure (1704) and a vacuum (1706) are first applied. Then, heat (1708) and pressure (1710) are applied to form the pre-formed pre-preg material (1712). Hence, as stated above, any single method or any combination of methods in any sequence discussed above can be used to form the pre-formed pre-preg material on the shaped core.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present disclosure. Therefore, it is manifestly intended that this disclosure be limited only by the claims and the equivalents thereof.

What is claimed is:

1. An assembly comprising:
    a stretch-forming device configured to stretch-form at least one section along a width of a sheet of pre-preg material to a longer length than at least one other section along the width of the sheet of pre-preg material before the sheet of pre-preg material is applied to a tool, the stretch-forming device comprising at least two members configured to apply a first force to the at least one section of the sheet of pre-preg material in a direction transverse to an advancing direction of the sheet of pre-preg material while applying a second force, less than the first force, in the direction transverse to the advancing direction of the sheet of pre-preg material in the at least one other section along the width of the sheet of pre-preg material, and to remove the first force applied to the at least one section of the sheet of pre-preg material in the direction transverse to the advancing direction of the sheet of pre-preg material before the sheet of pre-preg material is applied to the tool; and
    a guide roller positioned between the stretch-forming device and the tool, the guide roller configured to direct the sheet of pre-preg material onto the tool and including conical ends configured to retain the stretch-formed state of the pre-preg material, wherein the force applied to the at least one section of the sheet of pre-preg material in the direction transverse to the advancing direction of the sheet of pre-preg material is removed before the sheet of pre-preg material reaches the guide roller;
    wherein the tool includes a first forming surface on at least one axial end of the tool and a second forming surface, wherein the guide roller is configured to position the sheet of pre-preg material such that the at least one section of the pre-preg material corresponds to the first forming surface and the at least one other section along the width of the sheet of pre-preg material corresponds to the second forming surface.

2. The assembly of claim 1, wherein the at least two members comprise a pair of belts configured to pass the sheet of pre-preg material between the pair of belts, each belt having at least two sections, at least one section of each belt including extending ribs configured to stretch-form the at least one section of the sheet of pre-preg material as the sheet of pre-preg material passes between the pair of belts.

3. The assembly of claim 2, wherein at least one belt of the pair of belts includes spikes configured to grip the sheet of pre-preg material as it passes between the pair of belts.

4. The assembly of claim 2, further comprising at least one pressure platen configured and arranged to apply a select amount of pressure on at least one of the pair of belts to at least partially stretch-form the at least one section of the sheet of pre-preg material.

5. The assembly of claim 1, the at least two members comprise a pair of rollers configured to pass the sheet of pre-preg material between the pair of rollers, each roller having at least two sections, at least one section of each roller including teeth and grooves configured to stretch-form the at least one section of the sheet of pre-preg material as the sheet of pre-preg material passes between the pair of rollers.

6. The assembly of claim 5, wherein at least another section of each roller is cylindrical shaped.

7. The assembly of claim 6, wherein each roller comprises at least a third section, the at least a third section including teeth and grooves configured to stretch-form the at least one section of the sheet of pre-preg material as the sheet of pre-preg material passes between the pair of rollers.

8. The assembly of claim 7, wherein the at least another section of each roller that is cylindrically shaped is positioned between the at least one section and the at least a third section that include the teeth and grooves.

9. The assembly of claim 1, wherein the at least two members comprise:
    a first member having a first member width, the first member having at least one section that is different than at least one other section along the first member width; and
    a second member having a second member width, the second member having at least one section that is different than at least one other section along the second member width, the first member and the second member configured and arranged to pass the sheet of pre-preg material between the first and second members, the at least one section of the first member and the at least one section of the second member configured and arranged to stretch-form at least one section of the sheet of pre-preg material to a different length than at least one other section of the sheet of pre-preg material as the sheet of pre-preg material passes between the first and second members; and wherein the assembly further comprises at least one tensioning assembly configured and arranged to control tension on the sheet of pre-preg material passing between the first and second members.

10. The assembly of claim 9, wherein at least one of the first and second members includes spikes configured to grip the sheet of pre-preg material as it passes between the first and second members.

11. The assembly of claim 9, wherein the first and second members are first and second rollers.

12. The assembly of claim 11, wherein each of the first and second rollers have at least two sections, at least one section of each of the first and second rollers including teeth and grooves configured to stretch-form the at least one section of the sheet of pre-preg material as the sheet of pre-preg material passes between the first and second rollers.

13. The assembly of claim 12, wherein at least another section of each of the first and second rollers is cylindrical shaped.

14. The assembly of claim 13, wherein each of the first and second rollers comprises at least a third section, the at least a third section comprising including teeth and grooves configured to stretch-form the at least one section of the sheet of pre-preg material as the sheet of pre-preg material passes between the first and second rollers.

15. The assembly of claim 14, wherein the at least another section of each of the first and second rollers is cylindrically shaped is positioned between the at least one section and the at least a third section that include the teeth and grooves.

16. The assembly of claim 9, wherein at least one section of each of the first and second members are conical in shape to stretch-form the at least one section of the sheet of pre-preg material to the different length than the at least one other section of the sheet of pre-preg material.

17. The assembly of claim 9, wherein the at least one section of each of the first and second members includes shaped meshing gear teeth to stretch-form the at least one section of the sheet of pre-preg material to the different length than the at least one other section of the sheet of pre-preg material.

18. The assembly of claim 9, wherein the first and second members are first and second belts, at least one section of at least one of the first and second belts having extending ribs to stretch-form the at least one section of the sheet of pre-preg material.

19. The assembly of claim 9, wherein the first member is a roller and the second member is a belt.

20. The assembly of claim 19, further comprising at least one idler roller configured and arranged to apply tension to the belt.

\* \* \* \* \*